Patented Oct. 8, 1940

2,216,727

UNITED STATES PATENT OFFICE

2,216,727

BLAST FURNACE PROCESS

Julian M. Avery, Greenwich, Conn., assignor to Arthur D. Little, Inc., New York, N. Y., a corporation of Massachusetts No Drawing. Application February 15, 1938, Serial No. 190,582

9 Claims. (Cl. 75—41)

This invention relates to the smelting of pig iron in blast furnaces or the like, and has particular reference to the provision of an improved method of operation whereby the consumption of carbonaceous fuel, such as coke or the like, within the furnace, per ton of pig iron produced, may be substantially decreased without decreasing to an undesirable degree the reducing power of the gases within the furnace.

In my copending patent application, Serial No. 84,797, filed June 12, 1936, which has matured with Patent #2,131,031, Sept. 27, 1938, there is described a novel method of operating blast furnaces under substantial internal pressure, which makes possible a substantial decrease in coke consumption per ton of pig iron produced, by reason of the favorable influence of increased gas pressure within the furnace, upon the phenomenon customarily known as "solution loss" of carbon, i. e., the portion of the carbonaceous fuel that is "dissolved" in the gases and accordingly is lost. I have found that while the advantages obtained by this method of operation are important and substantial, they may be enhanced by the improvement hereinafter set forth.

In the aforementioned copending application, it is stated that if the solution loss of carbon, which normally amounts to from about 200 to about 400 pounds of carbon per ton of pig iron produced, can be eliminated or substantially decreased, it is possible to produce pig iron with as little as 1460 pounds of coke per ton of pig iron, as compared with the 1800 pounds or more that are now consumed in good blast furnace practice. It is also pointed out in that application that a substantial decrease in solution loss of carbon, by reason of the highly endothermic nature of the solution loss reaction, results in a large surplus of high temperature heat in the hearth and bosh of the furnace. I now find that this surplus of high temperature heat may in whole or in part be employed advantageously to preheat in the bosh, or other suitable part of the furnace, a quantity of fuel gas or the like introduced into the furnace for the purpose of gas enrichment, i. e. to augment and maintain the reducing power of the furnace gases in order to accelerate the reduction of the iron ore by the furnace gases at temperatures below those at which the solution loss reaction takes place to a serious extent, namely, at temperatures below about 1000° C.

By way of example, in the case of a furnace operating with a coke consumption of 1900 pounds (about 1700 pounds of fixed carbon) per ton of pig iron produced, with a solution loss of about 17.5% of the carbon fed with the charge (i. e. about 300 pounds of carbon), it can be shown that of the total solution loss, about 75 pounds (of carbon) is due to reduction of silica, manganese oxide and the like, and is therefore unavoidable, leaving about 225 pounds of carbon as the theoretically avoidable solution loss hereinafter called the "net solution loss." Assuming the principal solution loss reaction to be as follows:

$$CO_2 \times C = 2CO - 41{,}600 \text{ cal.}$$

and the overall combustion reaction at the tuyères to be $$C \times \tfrac{1}{2} O_2 = CO + 26{,}400 \text{ cal.}$$

it follows that the loss of one pound of carbon by the solution loss reaction absorbs heat equivalent to the combustion of about 1.57 pounds of carbon at the tuyères. However, the air blast is customarily preheated, so that additional heat is liberated within the furnace per pound of coke burned at the tuyères. In the case of the assumed example, the blast temperature was about 1138° F., giving a sensible heat content of about 10,500 cal. per mol. of carbon burned at the tuyères. The heat absorbed by one pound of carbon "dissolved" by the solution loss reaction is therefore equivalent to that supplied by the combustion of $$\frac{41{,}600}{26{,}400 + 10{,}500} = 1.13 \text{ pounds of carbon}$$

burned at the tuyères. It is thus clear that in the assumed example, thermal considerations alone would indicate that if the "net solution loss" of 225 pounds of carbon could be eliminated, the fixed carbon requirement per ton of pig iron might de decreased $225 \times 2.13 = 480$ pounds, or to about $1700 - 480 = 1220$ pounds, which is equivalent to about 1350 pounds of coke per ton of pig iron produced without decreasing the net amount of heat available within the furnace.

But for each pound of carbon thus eliminated from the charge, there is a corresponding decrease in the carbon monoxide content of the furnace gases, and since the quantity of oxygen to be removed from the iron ore is not changed, it is evident that if reduction is to take place by carbon monoxide, or its equivalent, according to the reaction $$Fe_xO_y + yCO = xFe + yCO_2$$

without subsequent reversion of $CO_2$ to $CO$, the average ratio of $$\frac{CO}{CO_2}$$

in the furnace gases will be considerably decreased. The inevitable result is a decrease in the specific rate of reduction of the ore by the furnace gases, for it is well known that the rate of a chemical reaction decreases as equilibrium is approached, and, for every temperature and every state of oxidation of iron ore, there exists an equilibrium ratio of $$\frac{CO}{CO_2}$$

below which reduction will not take place. This required minimum ratio of $$\frac{CO}{CO_2}$$

decreases as the temperature decreases, and as the state of oxidation of the iron ore increases, hence, in a counter-current system such as exists within the blast furnace, it is possible to reduce iron ore completely with relatively low ratios of $$\frac{CO}{CO_2}$$

provided the average temperature of reduction is relatively low. On the other hand, as the temperature and the ratio $$\frac{CO}{CO_2}$$

decrease, the specific rate of reaction decreases, and while increased pressure has the effect of increasing the specific rate of reaction under a given set of conditions roughly in proportion to the ratio of increase in absolute pressure of the gas, I have found that in some cases the pressure required to substantially decrease or eliminate solution loss by reducing the ore as completely as possible before it reaches high temperature zones of the furnace without adversely affecting the capacity of the furnace, is high enough to be inconvenient or undesirable in practice. For that reason, and for other reasons, I prefer to maintain the reducing power of the furnace gases at some desired degree by offsetting the decrease in CO produced from carbon fed with the charge, by means of a fuel gas such as producer gas, coke oven gas, water gas or the like, introduced into the furnace at some convenient point, in controlled quantity and preferably at a controlled temperature.

In the case previously described by way of example, the "net solution loss" amounts to about $$\frac{225}{26.5} = 8.5 \text{ kg. mols. of carbon,}$$

corresponding to a heat loss within the furnace of $8.5 \times 41,600 = 354,000$ kg. cal. This is sufficient to heat to 1000° C. about 49 kg. mols. of carbon monoxide, and since two molecules of CO are produced for each molecule of carbon lost by the solution loss reaction, or $8.5 \times 2 = 17$ mols. CO in the present example, the surplus heat available is obviously sufficient to heat to 1000° C. nearly three times as much carbon monoxide as is required to maintain the reducing power of the gases in higher levels, i. e. lower temperature zones of the furnace.

Because of its low cost, producer gas is an excellent medium for gas enrichment after the manner of the invention, and when used as produced, its temperature, on the order of 1000 to 1200° F., dispenses with any necessity for preheating. However, when not so used as produced or without substantial preheating, the large inert nitrogen content of producer gas obviously involves the absorption of a large quantity of heat, so that the use of a richer fuel gas such as coke oven gas or water gas may sometimes be desirable. Obviously, the richer the fuel gas used, the greater is the degree to which the furnace gases can be enriched with the absorption of a given quantity of heat. The optimum balance between fuel consumption at the tuyères, blast preheat, and the type and quantity of gas used for enrichment is a matter of economics which will vary widely with local conditions. Gas enrichment after the manner of the invention is feasible and practical, and wide variation in the conditions employed are possible without departing from the spirit of the invention.

It will be seen that the present invention provides additional means for the control of temperature and reducing conditions within the various zones of blast furnaces not possible by operating procedures hitherto known or used. I am aware that it has been proposed to inject fuel gas into the tuyère zone of a blast furnace in order to decrease coke consumption. However, with that expedient, because of the presence of a large excess of carbon at a high temperature, combustion will not take place and the net effect is therefore not directly to save coke as proposed, but to increase the reducing power of the furnace gases. Such a procedure, however, has the unavoidable serious disadvantage of absorbing high temperature heat just where it is developed and needed, whereas the method of the present invention contemplates the introduction of the fuel gas into the furnace at zones or levels where a surplus of high temperature heat exists, or can be made to exist, as in the bosh when solution loss is decreased, and thus avoids lowering the temperature in the tuyère zone. Moreover, by preheating the fuel gas to any desired degree, and introducing more or less fuel gas of various kinds as may be desirable or convenient, and by utilizing a portion of the surplus of high temperature heat to decrease the blast temperature, it is possible to control closely, and to change rapidly at will, the temperature conditions and gradients in all portions of the furnace including the hearth, as well as to control the reducing power of the furnace gases and the fuel value of the top gas in any desired manner and to any desired degree. This additional control over the melting conditions within the furnace, together with the possibility of replacing expensive coke by cheap fuel gas or surplus fuel gas generated outside the blast furnace, are very important advantages of the invention.

As has been generally stated, gas enrichment in the various blast furnace zones after the manner of the present invention makes possible rapid reduction of iron ore in relatively low temperature zones of the furnace conjointly with a large decrease in carbonaceous fuel fed with the charge, without the use of excessively high pressures, and this is especially true if the fuel gas used contains, or is capable of supplying by thermal decomposition or chemical reaction within the furnace, a substantial proportion of hydrogen which, as is well known, reduces iron ore more rapidly than does carbon monoxide. An example of such a gas is steam.

While the invention is primarily directed to improvement in the art of operating blast furnaces under increased overall pressures, i. e., at pressures at the furnace top in excess of normal pressures of less than about ¼ atmosphere gauge, gas enrichment after the manner of the invention may also frequently be advantageous in the smelting of pig iron under normal pressure conditions, by increasing the rate of reduction of iron ore in lower temperature zones of the furnace, thereby decreasing "solution loss" without adversely affecting temperature conditions in the tuyère zone.

Although certain preferred methods of practicing the invention have been described herein, it is to be understood that the invention is not limited thereby, but is susceptible of changes within its scope as defined by the appended claims.

I claim:

1. The method of operating a blast furnace, which comprises maintaining in the furnace a superatmospheric top pressure in excess of about one quarter atmosphere gauge to decrease the solution of carbon in the gases, and introducing into the furnace at the zone in which solution of carbon normally takes place a gas of the group consisting of reducing gases and gases capable of forming ore-reducing gases by reaction with carbon, to compensate for the decrease in the quantity of carbon monoxide resulting from said decrease in the solution of carbon in the furnace gases.

2. The method of operating a blast furnace, which comprises maintaining in the furnace a superatmospheric top pressure in excess of about ¼ atmosphere gauge to decrease the solution of carbon in the furnace gases, and introducing into the furnace at the zone at which solution of carbon takes place an ore-reducing gas rich in hydrogen to compensate for the decrease in the quantity of carbon monoxide resulting from said decrease in the solution of carbon in the furnace gases.

3. The method of operating a blast furnace, which comprises maintaining in the furnace a superatmospheric top pressure in excess of about ¼ atmosphere gauge to decrease the solution of carbon in the furnace gases, and introducing into the furnace at the zone at which solution of carbon takes place an ore-reducing fuel gas rich in carbon monoxide to compensate for the decrease in the quantity of carbon monoxide resulting from said decrease in the solution of carbon in the furnace gases.

4. The method of operating a sealed blast furnace, which comprises supplying the blast feed gas at superatmospheric pressure, maintaining the gases at the top of the furnace under a gauge pressure of at least one-fourth atmosphere and introducing into the furnace at a zone above that at which the blast feed gas is supplied a gas for accelerating the reduction of the ore within the furnace, and decreasing the operating temperature in the zone above the zone at which the last named gas is supplied, said gas being selected from the group consisting of reducing gases and gases capable of forming ore-reducing gases by reaction with carbon.

5. The method of operating a sealed blast furnace, which comprises supplying the blast feed gas at superatmospheric pressure, maintaining the gases at the top of the furnace under a gauge pressure of at least one-fourth atmosphere, and introducing into the furnace at a zone above the zone at which the blast feed gas is supplied a hydrogen-forming gas for accelerating the reduction of the ore within the furnace.

6. The method of operating a sealed blast furnace, which comprises supplying the blast feed gas at superatmospheric pressure, maintaining the gases at the top of the furnace under a gauge pressure of at least one-fourth atmosphere, and providing in the furnace at a zone above the zone at which the blast feed gas is supplied a reducing gas rich in carbon monoxide for accelerating the reduction of the ore within the furnace.

7. The method of operating a blast furnace, comprising maintaining in said furnace a top pressure in excess of about one-fourth atmosphere gauge, whereby solution loss of carbon is decreased and a surplus of high temperature heat is developed within the furnace above the tuyère zone and at a thermal potential in excess of about 1,000° C., and providing in the furnace at a point above the tuyère zone but within the zone within which the solution loss normally occurs a quantity of gas sufficient to accelerate the reduction of the ore at temperatures below the solution loss temperature, said gas being selected from the group consisting of reducing gases and gases capable of forming an ore-reducing gas by reaction with carbon.

8. The method of operating a blast furnace to reduce solution loss of carbon and decrease the high temperature heat within the furnace above the tuyère zone, comprising maintaining in said furnace a substantial superatmospheric top pressure of at least one quarter atmosphere gauge and absorbing said surplus high temperature heat by introducing a reducing gas into the furnace at a point above the tuyère zone whereby the zone of the furnace immediately above that into which the said gas is introduced is brought to a desired temperature level.

9. The method of operating a blast furnace to reduce solution loss of carbon and decrease the high temperature heat within the furnace above the tuyère zone, comprising maintaining in said furnace a substantial superatmospheric top pressure of at least one quarter atmosphere gauge, and absorbing said surplus high temperature heat by introducing a gas capable of reacting with carbon to form a reducing gas into the furnace at a point above the tuyère zone, whereby the zone of the furnace immediately above that into which the said gas is introduced is brought to a desired temperature level.

JULIAN M. AVERY.